(12) United States Patent
Jagdfeld et al.

(10) Patent No.: US 11,306,820 B2
(45) Date of Patent: Apr. 19, 2022

(54) MOUNTING DEVICE FOR A FLAT SEAL OF A FLANGE CONNECTION

(71) Applicant: FORSCHUNGSZENTRUM JUELICH GMBH, Juelich (DE)

(72) Inventors: Heinz Jagdfeld, Alsdorf (DE); Larisa Semke, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 133 days.

(21) Appl. No.: 16/461,826

(22) PCT Filed: Dec. 2, 2017

(86) PCT No.: PCT/DE2017/000411
§ 371 (c)(1),
(2) Date: May 17, 2019

(87) PCT Pub. No.: WO2018/113808
PCT Pub. Date: Jun. 28, 2018

(65) Prior Publication Data
US 2019/0360590 A1    Nov. 28, 2019

(30) Foreign Application Priority Data

Dec. 21, 2016 (DE) .................... 10 2016 015 190.0

(51) Int. Cl.
| | |
|---|---|
| F16J 15/08 | (2006.01) |
| F16L 23/00 | (2006.01) |
| F16L 23/02 | (2006.01) |
| F16L 23/04 | (2006.01) |
| F16L 23/20 | (2006.01) |

(52) U.S. Cl.
CPC ......... *F16J 15/0881* (2013.01); *F16L 23/003* (2013.01); *F16L 23/02* (2013.01); *F16L 23/04* (2013.01); *F16L 23/20* (2013.01); *F16L 2201/40* (2013.01)

(58) Field of Classification Search
CPC .. F16J 15/02; F16J 15/021; F16J 15/06; F16J 15/061; F16J 15/0818; F16J 15/0831; F16J 15/0881; F16L 23/003; F16L 23/02; F16L 23/04; F16L 23/20; F16L 2201/40
See application file for complete search history.

(56) References Cited

U.S. PATENT DOCUMENTS 4,311,248 A * 1/1982 Westerlund ............. F16L 33/12
277/616
4,418,948 A * 12/1983 Lew ........................ F16L 23/18
285/112

(Continued)

FOREIGN PATENT DOCUMENTS

| EP | 0437193 A1 | 7/1991 |
|---|---|---|
| WO | WO 2011071521 A1 | 6/2011 |
| WO | WO 2016041699 A1 | 3/2016 |

*Primary Examiner* — Gilbert Y Lee
(74) *Attorney, Agent, or Firm* — Leydig, Voit & Mayer, Ltd.

(57) ABSTRACT

A mounting device for a flat seal of a flange connection that includes a first flange, a second flange, and a flat seal arranged between the flanges. The mounting device includes a clamping jaw for a clearance between the first flange and the second flange. The clamping jaw tapers at an end to a nose for holding the flat seal.

14 Claims, 10 Drawing Sheets

(56) References Cited

U.S. PATENT DOCUMENTS

| | | | | |
|---|---|---|---|---|
| 5,076,617 A * | 12/1991 | Bronnert | ............... | F16L 23/18 |
| | | | | 277/608 |
| 5,947,533 A * | 9/1999 | Fisher | ............... | F16L 23/22 |
| | | | | 277/614 |
| 6,234,545 B1 * | 5/2001 | Babuder | ............... | F16L 23/10 |
| | | | | 277/608 |
| 7,350,833 B2 * | 4/2008 | Bongiorno | ............... | F16L 23/02 |
| | | | | 277/608 |
| 9,249,909 B2 * | 2/2016 | Ikushima | ............... | F16K 27/02 |
| 2005/0200128 A1 | 9/2005 | Bongiorno | | |

\* cited by examiner

MOUNTING DEVICE FOR A FLAT SEAL OF A FLANGE CONNECTION

CROSS REFERENCE TO RELATED APPLICATIONS

This application is a U.S. National Stage Application under 35 U.S.C. § 371 of International Application No. PCT/DE2017/000411 filed on Dec. 2, 2017, and claims benefit to German Patent Application No. DE 10 2016 015 190.0 filed on Dec. 21, 2016. The International Application was published in German on Jun. 28, 2018 as WO 2018/113808 A1 under PCT Article 21(2).

FIELD

The invention relates to a mounting device for a flat seal of a flange connection.

BACKGROUND

CF flanges are described in ISO 3669 at the nominal widths of DN 16 to DN 250, and in more detail in ISO/TS 3669-2 at the nominal widths of DN 10 to DN 400.

CF flanges are based inter alia on the CONFLAT flanges by the company Varian. CF flanges are used for connections of ultra high vacuum (UHV) components; the flanges themselves are comprised of stainless steel, the sealing material is usually copper.

A CF connection consists of two symmetrical flanges with cutting edges; a metal flat seal which is centered in a flat undercut, or a turned groove, or a channel of the CF flange; and a sufficient number of screws which ensure the necessary high contact pressure. In addition to fixed flanges which are each to be aligned around a hole position, there are rotatable collar flanges so that the flanges can be oriented arbitrarily about their major axis.

To produce an ultra high vacuum (UHV), special requirements are to be placed on materials and connections. The CF standard ISO/TS 3669-2:2007 has been established for this purpose in UHV engineering. The CF flanges are made from stainless steel circular blanks on CNC lathes. The flanges are normally divided into two parts and consist of an inner part with the sealing surface and an outer part with the screw holes. The flanges have the groove for receiving the seal on the vacuum side, and a cutting edge as a sealing surface. Because of the low leakage rate and high bakeability required in UHV engineering, the sealing of the CF flanges takes place via a flat seal made of oxygen-free (OFHC) copper. This generally can be used only once due to the plastic deformation by the cutting edges. The contact pressure, for example, is generated by the screws which are tightened without distortion.

During assembly, the cutting edges of the flanges press into the enclosed sealing disk and deform it. What is known as extrusion takes place on the outer cutting flanks; the cutting process takes place at the same time on the inner side. Creeping is limited by the outer vertical flange walls so that very high pressures occur in the boundary layer. Under the high pressure, the copper conforms to the microstructure of the cutting edges and fills smaller surface defects, thereby producing a metallic ultra high vacuum-tight connection.

QCF components and the associated VaCFix® tension chains are a product design of VACOM. They have conical tightening surfaces and combine the sealing principle of the ConFlat® flange (cutting edges according to ISO/TS 3669-2) with a simple assembly via what is known as a chain lock. The QCF components can be assembled faster, more easily, and at the same time in a more space-saving manner, and are normally connectable by means of adapters to all existing vacuum systems. The CF-QCF adapters allow the user to use the QCF connection technique on existing UHV systems, and thus to work flexibly as well as independently of suppliers. The advantage of the QCF technology lies in the shorter assembly time, by up to 75%.

(Q)CF flange connections have a low leakage rate of <1.0E-11 mbar l/s and are bakeable. CF flanges are available in a size from DN 10 to DN 400, QCF flanges in a size from DN 16 to DN 100.

Different kits and flange connections are available from different suppliers. Rotatable or fixed flange connections with and without pipe socket, reducers, T-pieces and cross-pieces, and a variety of other components are marketed for CF flanges.

SUMMARY

In an embodiment, the present invention provides a mounting device for a flat seal of a flange connection. The flange connection includes a first flange, a second flange, and a flat seal arranged between the flanges. The mounting device includes a clamping jaw for a clearance between the first flange and the second flange. The clamping jaw tapers at an end to a nose for holding the flat seal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
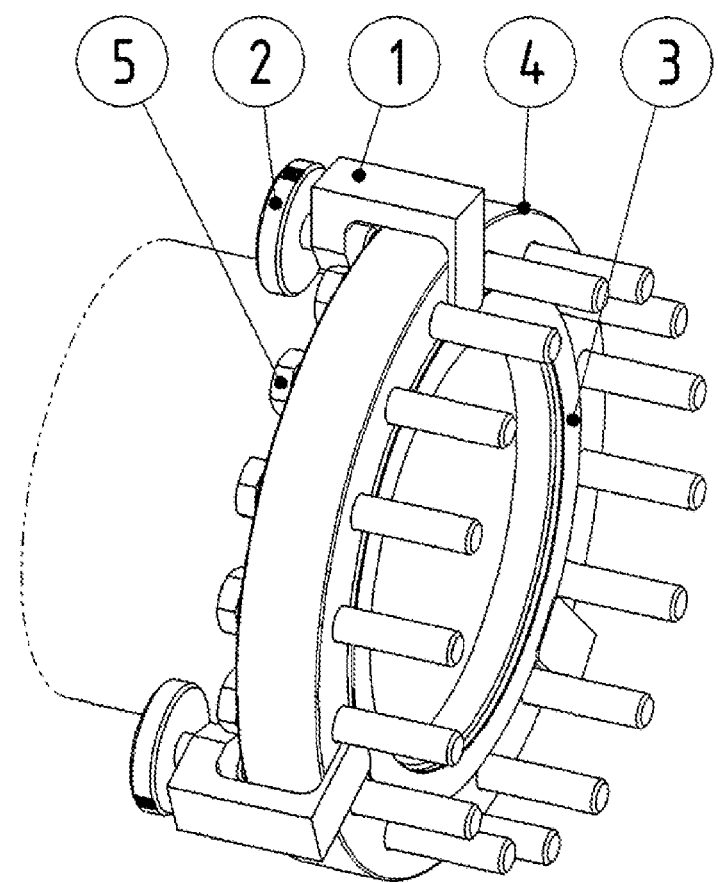
FIG. 1 shows a mounting device on a CF flange in an isometric view.

Although the (Q)CF flange connections have the aforementioned advantages, they nevertheless have some serious disadvantages in practice. Given difficult installation positions and space conditions, first an attempt is made manually or with improvised tools, such as e.g. with screwdrivers, plates, adhesive strips and so forth, to first introduce the seal between the two flanges into the correct position, i.e. into the groove, and also to hold it there.

Under such difficult and confined installation positions, such as e.g. a vertical arrangement of the sealing surface arranged relative to the Earth's surface and simultaneously confined space conditions, the seal disadvantageously often falls out of the groove and to the ground, or it does not remain precisely at the place provided for it on or in the groove. The seal can then usually no longer be used again because of damage or contamination, or because of an incorrectly cut surface, or else the flange connections produced in this way do not have the necessary low leakage rate even after evacuation for several hours.

Two or even more persons are often required for assembly in order to achieve the necessary, careful assembly. This disadvantageously leads to increased personnel expenditure and additional costs. Even a slight slippage of the seal in the groove very often leads to leaks, which in turn must be remedied afterward with an additional assembly effort. In vacuum applications, the entire system must then be regularly cleaned again and pumped out, which in turn is linked with a significant time expenditure and costs.

Embodiments of the invention provide mounting devices for a flat seal of a flange connection which easily, and thereby cost-effectively, leads to a proper assembly of the flat seal in the flange connection. Further embodiments of the invention specify methods for assembling a flat seal for a flange connection, which methods reduce or even completely eliminate the cost, time, personnel and material expense, and at the same time lead to a proper, reliable assembly with a correct seating of the flat seal and ultimately low leakage rate of the flange connection.

A mounting device is provided for a flat seal of a flange connection. The flange connection comprises a first flange and a second (counter)flange, and a flat seal arranged between the flanges. Instead of a counterflange, it is also possible to provide other connecting elements which exert a contact pressure to deform the flat seal and thus to bring about the gas-tightness of the flange connection. These include, for example, adapters, T-pieces, elbows, bellows, inspection windows, measuring devices, pumps, and so on.

The mounting device advantageously has at least one clamping jaw which tapers to a nose at the free end.

The nose is advantageously arranged only at the outermost free end of the clamping jaw and in extension thereof. The clamping jaw, which engages in the clearance between the two flanges, creates a gap between the two flanges.

Together with the groove of the flange, the nose arranged on the free end of the clamping jaw advantageously forms a restricted guidance for the flat seal, from which the seal can no longer be released during the further assembly of the flange connection. This advantageously has the effect that the flat seal remains positioned in the groove in a highly precise manner during the assembly of flange connection. This restricted guidance, consisting of the groove of the flange and the nose of the clamping jaw as a combined arrangement, is necessary according to the invention in order to prevent the flat seal from slipping.

This is advantageously produced in that the assembly of the flanged connections can be performed by just one person, without additional tools.

The mounting device according to the invention may itself have various shapes that can be adapted to the type of the respective flange.

The feature of the mounting device according to the invention is in each case the nose(s) arranged at the free end of the clamping jaw(s) for holding the flat seal in the gap between the flanges, as well as the thickness of the clamping jaw(s), as explained below.

In this instance, the nose is arranged in the extension of the clamping jaw or aligned therewith, and in fact on the side of the clamping jaw which is oriented in the direction of the counterflange.

The mounting device can have the form of a screw clamp, for example. It then has a U-shaped profile in cross section, wherein one leg of the U is formed by the clamping jaw with the nose for the clearance of the flange.

Alternatively, the mounting device can also have the form of a circular clamping bracket which can be placed on the outer circumference of a QCF flange and fixed externally thereto. This mounting device then has an L-shaped profile in cross section, wherein one leg of the L is formed by the clamping jaw with the nose for the clearance between the flanges. By contrast, the region executed perpendicular thereto is placed on the outer circumference of the flange and supports the fastening means, e.g. a knurled nut.

U-shaped profiles of the mounting device are particularly advantageous for CF flange connections. The leg arranged parallel to the clamping jaw bears a fastening means for fastening the mounting device to a flange.

L-shaped profiles of the mounting device are particularly advantageous for QCF flange connections. A clamping bracket as a mounting device according to the invention completely surrounds the outer edge of a flange, wherein given the U shape the clamping jaw forms a gap between the two (Q)CF flanges.

The mounting device is preferably made of VA stainless steel.

For QCF flange connections, the mounting device can in particular comprise a two-leg clamping bracket with a joint between the two brackets. The joint is designed in such a way that it advantageously ensures an easy opening and closing of the mounting device on the flange, so that only one of the two legs of the clamping bracket needs to be released, and the other leg with its two clamping jaws remains on the outer circumference of the flange or in place to hold the flat seal.

In one embodiment of the invention, the clamping bracket has at least two, preferably three, or more preferably four, and possibly more clamping jaws that uniformly engage in the clearance of the flange connections which each suddenly taper to a nose at their end.

The maximum thickness of the clamping jaw of the mounting device according to the invention should be smaller than the thickness of the flat seal.

This is advantageously produced in that the clearance of the two flanges is smaller than the thickness of the flat seal while mounting the counterflange, and thus it is impossible for the flat seal to fall out or slip.

The thickness of the nose at the end of the clamping jaw should be smaller than the difference between the thickness of the clamping jaw and the projection of the seal when it abuts the cutting edge.

According to the ISO standard for (Q)CF flanges, the flat seal is accordingly not completely recessed into the groove, but has in cross section a projection with which it protrudes into the clearance between the two flanges.

Ideally, the dimension should be selected such that the seal can still rotate freely in the groove when the clamping jaws are mounted. It is hereby ensured that the seal is not pressed against the cutting edge and damages it. Moreover, whether the seal is seated correctly can thus be easily checked.

Advantageously, the nose at the end of the clamping jaw has approximately 10 to 40%, preferably 20 to 30%, in particular approximately 25% of the thickness of the clamping jaw as a whole. For example, the maximum thickness $D1$ of the clamping jaw can be 1.9 mm given a 2 mm thickness $D2$ of the flat seal. According to this comparison, the nose then has a thickness of approximately 190 to 760 μm, preferably 380 to 570 μm, and especially a thickness of approximately 475 μm.

The clamping jaw tapers advantageously abruptly at the end to form the nose. The clamping jaw therefore does not taper in a continuous manner toward its end. The nose of the clamping jaw advantageously holds the flat seal at the outer edge of the flat seal, in its provided position in the groove.

The mounting device moreover has the fastening means for fastening the mounting device to the flange. The fastening means is in particular a knurled nut, or knurled screw, or a quick-release fastener for fastening the mounting device to the outside of a flange. The shape of a clamping bracket or of a screw clamp as a mounting device advantageously ensures that the fastening means is arranged outside of the space between the flanges. By tightening the knurled nut, the screw is screwed to the outside of the flange so that the mounting device is fixed to the flange on the outside, wherein the nose at the free end of the clamping jaw, which nose extends into the clearance, holds the flat seal in the positive restricted guidance at the groove.

A screw kit can likewise advantageously be the subject of the invention, in particular for connecting CF flanges. The kit then advantageously comprises hexagonal bolts, e.g. according to ISO 4017; hexagonal nuts, e.g. according to ISO 4032; and washers, e.g. according to ISO 7089, as well as at least one mounting device according to the invention. The kit may optionally have one or more flanges and/or a flat seal.

The method for mounting a flat seal in a flange connection comprising two flanges is characterized by the steps:
  a) A flat seal is inserted into a groove of a (first) flange. The outer edge of the flat seal thereby rests against the outer edge of the groove.

This advantageously causes the outer edge of the flat seal to be adapted to the outer edge of the groove, and causes the flat seal to come into contact with the cutting edge of the first flange. The outer edge of the flat seal partially lies against the outer edge of the groove, according to the ISO standard. The groove represents a depression in the profile of the flange. The depression further forms part of the restricted guidance as an arrangement according to the invention, together with the nose of the clamping jaw, as will be shown in step b) or step c), respectively. With its free surface lying opposite the groove, the flat seal projects somewhat into the clearance between the two flanges and forms the aforementioned projection.
  b) A mounting device according to the invention is selected, with a clamping jaw for the clearance between the flange and a tapering nose at the end of the clamping jaw.

Together with the groove of the flange, the nose arranged on the free end of the clamping jaw forms a positive arrangement as a restricted guidance for the flat seal, from which the flat seal cannot be released during the further assembling of the flange connection before the second flange is mounted. This advantageously causes the flat seal to remain positioned in the groove during the assembly of the flange connection. In the instance of mounting devices with a U-profile (screw clamps), at least two, preferably at least three units of this mounting device should be arranged uniformly distributed on the flange so that the flat seal is held in position. In the instance of a clamping bracket with an L-profile, it should have at least one section, preferably 2 or even better four sections, that are designed as clamping jaws with noses and can be arranged uniformly distributed on the inner surface of the flange.

It is important to choose the thickness $D1$ of the clamping jaw of the mounting device to be slightly smaller than the thickness $D2$ of the flat seal to be used. This advantageously has the effect that the flat seal is then held in the groove of the flange and does not fall out of the groove, or jam.
  c) The clamping jaw of the mounting device is pressed against the inner side of the flange for this purpose. The inner side is directed into the clearance between the flanges. The nose of the clamping jaw bears against the outer, exposed surface of the flat seal directed towards the clearance, and is positioned opposite the groove of this flange in which the flat seal rests; the mounting device hereby forms the positive restricted guidance for the flat seal in the groove.

The term "slightly" in this context means that the length of the nose is chosen such that the forward, free end of the nose ends somewhat before the position, and not opposite the cutting edge. This advantageously ensures that the seal is not touched by the nose in the cutting edge region, or even within the cutting edge region (vacuum region), so that no contamination or damage to the seal can occur.

For this purpose, the clamping jaw of the mounting device has a surface directly adjacent to the inside of the flange, and an initially free surface which is aligned with the counter-flange.
  d) The mounting device is attached to the outside of the flange by its fastening means arranged outside of the clearance for the flange connection, whereby the flat seal is fixed in the groove;

For this purpose, a knurled nut or knurled screw of the mounting device can be screwed against the outer wall of the first flange. With the nose, the inwardly directed clamping jaw of the mounting device furthermore extends slightly beyond the outer edge of the flat seal and fixes it in its position in that the knurled screw or knurled nut is tightened.

Of course, the person skilled in the art of UHV engineering can choose a different fastening means, e.g. a quick-release fastener for the mounting device.
  e) The counterflange, or another connecting component that generates a contact pressure to deform the flat seal, is pressed against the first flange, wherein the surface of the second flange directed toward the clearance is initially distanced from the flat seal by the clamping jaw; the two flanges are e.g. fixed in the holes in the two CF flanges via the insertion and tightening of screws, or are fixed to one another by the screws of a tension chain according to the prior art for QCF flanges. These fastening means are tightened only hand-tight.

The clamping jaw, together with the nose of the mounting device, initially distances the two mutually facing surfaces of the flanges from one another and, by its thickness $D1$, forms a gap between the flanges from which the flat seal with the thickness $D2$ cannot escape, since $D2>D1$.
  f) The fastening means of the mounting device is released, and the clamping jaw is removed from the clearance between the flanges, wherein the flat seal remains in its precise position;

Since the clamping jaw is slightly thinner than the flat seal, it remains in position, that is to say exactly in the grooves in the two flanges.

g) A contact pressure is generated by means for connecting the flanges, and the flat seal is deformed in the flange connection.

For this, the second flange is brought into direct contact with the first flange by the means for connecting the flanges. The bridging gap initially produced by the clamping jaw becomes increasingly smaller after the removal of the clamping jaw of the mounting device from the clearance, and due to the tightening of screws or a fastening of the tension chain from the prior art, until the flat seal held in the groove of the first flange is pressed into the groove of the second flange. By further properly fastening the two flanges to one another, the flat seal is deformed by the developed contact pressure until it is gas-tight. A gas-tight connection is hereby advantageously provided.

The correct seat of the flat seal in the groove of the first flange may optionally be checked by the existence of free rotation capability of the flat seal in the groove after step d) and before step e). The mounting device is thus fastened and accordingly allows correct seating of the flat seal in the groove on the one hand, and free rotation about the axis of the flat seal on the other hand.

For example, in the instance of a CF flange connection, the contact pressure is produced by screws for fastening the flange to the counterflange. After step e) and before step f), the screws are passed through the two flanges, and the flanges are initially fastened loosely to one another with nuts.

This advantageously has the effect that at least one screw clamp, as a mounting device consisting of the flanges fastened loosely to one another, can be released from the first flange, and the clamping jaw can be removed from the gap between the flanges. The flat seal advantageously remains positioned in the groove of the flange upon releasing the mounting device, since the gap formed by the mounting device is narrower than the thickness of the flat seal. In other words, the thickness of the clamping jaw is less than the thickness of the flat seal.

In an advantageous embodiment of the invention, for CF flange connections three mounting devices according to the invention in the form of U-shaped screw clamps are fastened to the first flange between the holes during the process. Since the clamping jaw of the screw clamp, said clamping jaw engaging in the clearance between the flanges, is narrower than the clearance between the screw holes, the mounting devices do not hinder the preliminary fastening of the second CF flange to the first flange with the screws. Three mounting devices for CF flanges are preferably provided.

In the instance of a QCF flange connection, the contact pressure for the deformation of the flat seal can alternatively also be generated by a tension chain from the prior art for fastening the flanges to one another. For this purpose, after step f), meaning after detaching and removing a clamping bracket as a mounting device, the tension chain can be placed over the two conical outer surfaces of the QCF flanges and contact pressure can be generated by the screws of the tension chain. The flat seal also advantageously remains positioned in the groove of the flange, since the gap between the flanges that is formed by the mounting device is narrower than the thickness of the flat seal. In other words, the thickness of the clamping jaw is less than the thickness of the flat seal.

For the QCF flange connection, the counterflange is preferably first pressed by hand onto the flange with the flat seal. The upper half of the two-leg clamping bracket according to the invention is then released. Two of the in particular four noses then preferably remain on the lower region of the flat seal and hold it in its position so that it cannot fall out of the groove of the flange. After the top half of the clamping bracket has been released, the upper half of the tension chain known from the prior art is placed over the conical outer surfaces of the flanges. Due to the weight of the tension chain and the dimensions, the tension chain already fixes the two flanges to one another. The second, lower part of the clamping bracket according to the invention is then released from the flange, and instead the lower part of the tension chain known from the prior art is placed on the conical surfaces of the flange. Accordingly, the links of the tension chain are then fastened to one another with the usual hexagonal nuts, and the contact pressure is generated for the deformation of the flat seal.

The methods according to the invention and the devices according to the invention ensure that at no point in time does one of the two cutting edges of the two flanges touch the nose of the holding jaw of the mounting device. This advantageously results in the seal not being touched in the cutting edge region, or even within the cutting edge region (vacuum region). This hereby advantageously has the effect that no contamination or damage to the seal can occur. Moreover, the cutting edge itself is protected from damage. In the direction of the flat seal, the nose of the clamping jaw is separated by this from the cutting edge of the first flange. In the direction of the second flange, the nose cannot arrive in the recessed groove due to the parallel arrangement of the clamping jaw relative to the inner surface of the flange.

The flat seal is thus held in its position on one flange side by the mounting device. By a preliminary mounting of the other flange side, the method provides for the removal of the mounting device, and only afterward for the generation of the contact pressure, which finally tightens the two flanges. In this instance, the shape and dimensions of the retaining noses or holding surfaces are the essential features of the mounting device, and there is no danger that the seal may slip.

It is understood that the diameter of the clamping brackets according to the invention is adapted to the diameter of the QCF flanges according to the ISO standard.

FIGS. 1 to 4 show a mounting device according to an embodiment of the invention for CF flanges, as well as a method for mounting the flat seal.

FIG. 1 shows the mounting device on the CF flange in an isometric view. In a first step, the CF flange 4 is equipped with screws 5 and washers 6 (not shown in FIG. 1). The flat seal 3 for CF and QCF components by default consists of oxygen-free copper. It is positioned with the mounting device 1, 2 on the CF flange. Care should be taken that only the retaining noses of the three mounting devices 1, 2 rest on the flat seal 3 (see FIG. 3).

A total of three mounting device 1, 2 units are recommended for this purpose and arranged between the holes, as shown in FIG. 1. The knurled screws 2 of the mounting devices are then tightened carefully.

Figure 2:
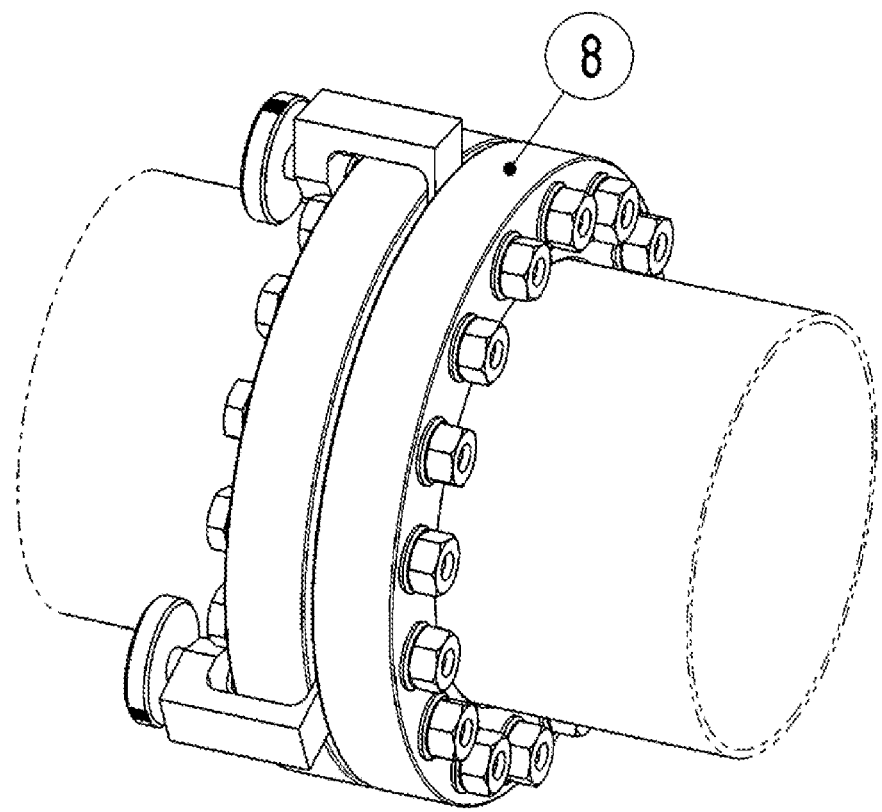
FIG. 2 shows pre-assembled CF flanges in an isometric view.

FIG. 2 furthermore shows the preassembled CF flanges. In the second step, the counterflange 8 is then axially aligned and pushed onto the mounting devices. The nuts 7 are then tightened manually (FIG. 3).

Figure 3A:
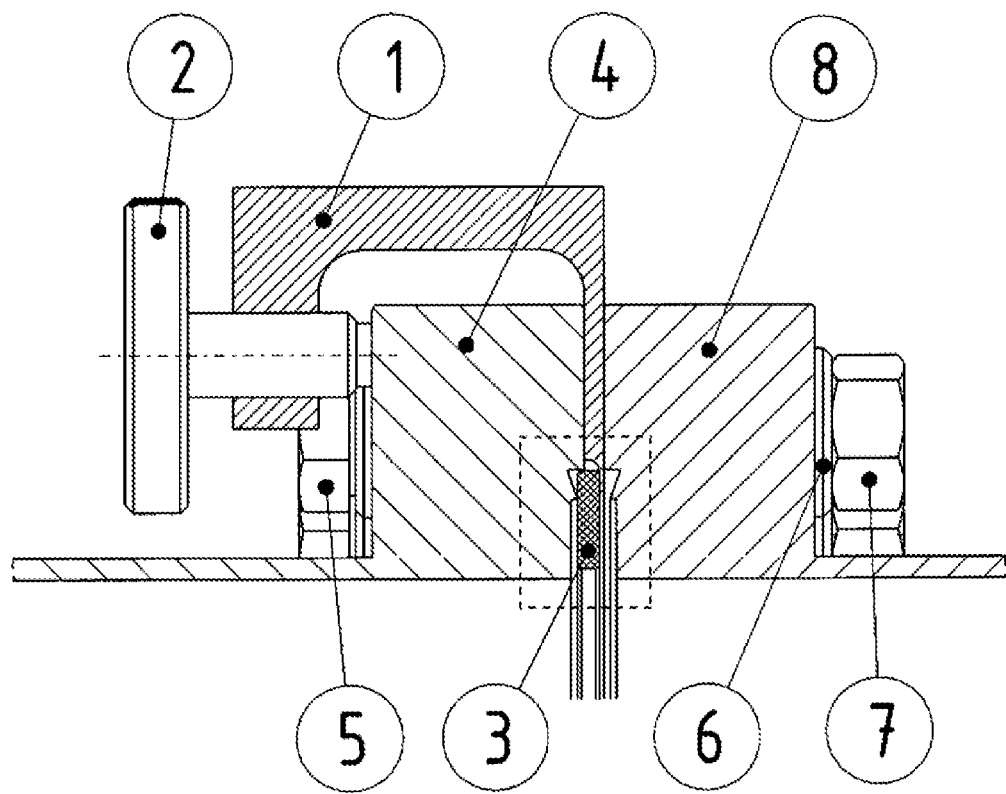
FIG. 3a) shows a section of a mounting device for CF flanges.
Figure 3B:
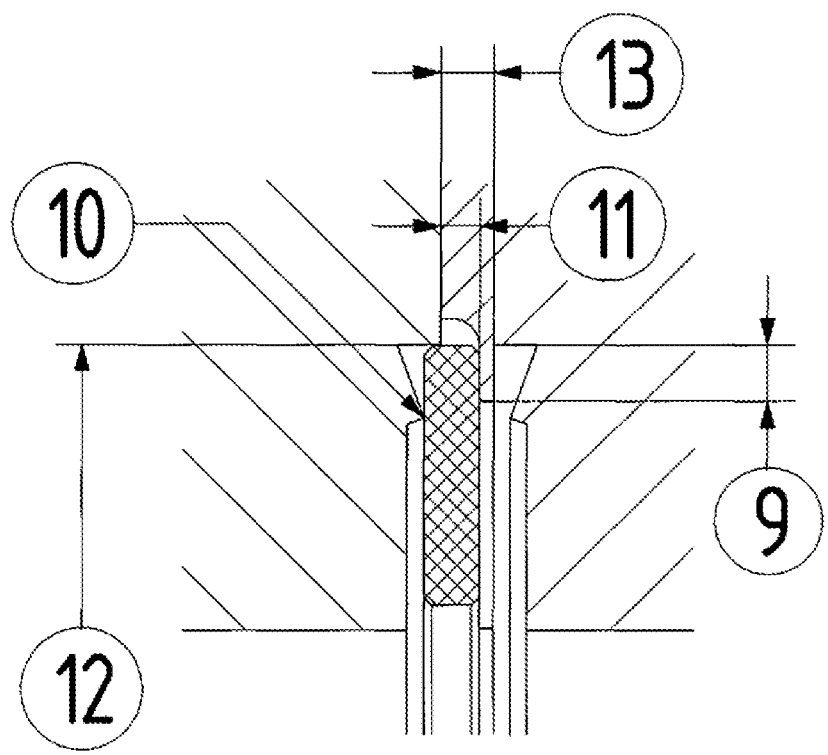
FIG. 3b) shows an enlarged detail according to the dotted box of a), with assembled components (top) and in an exploded view (bottom)
Figure 3B:
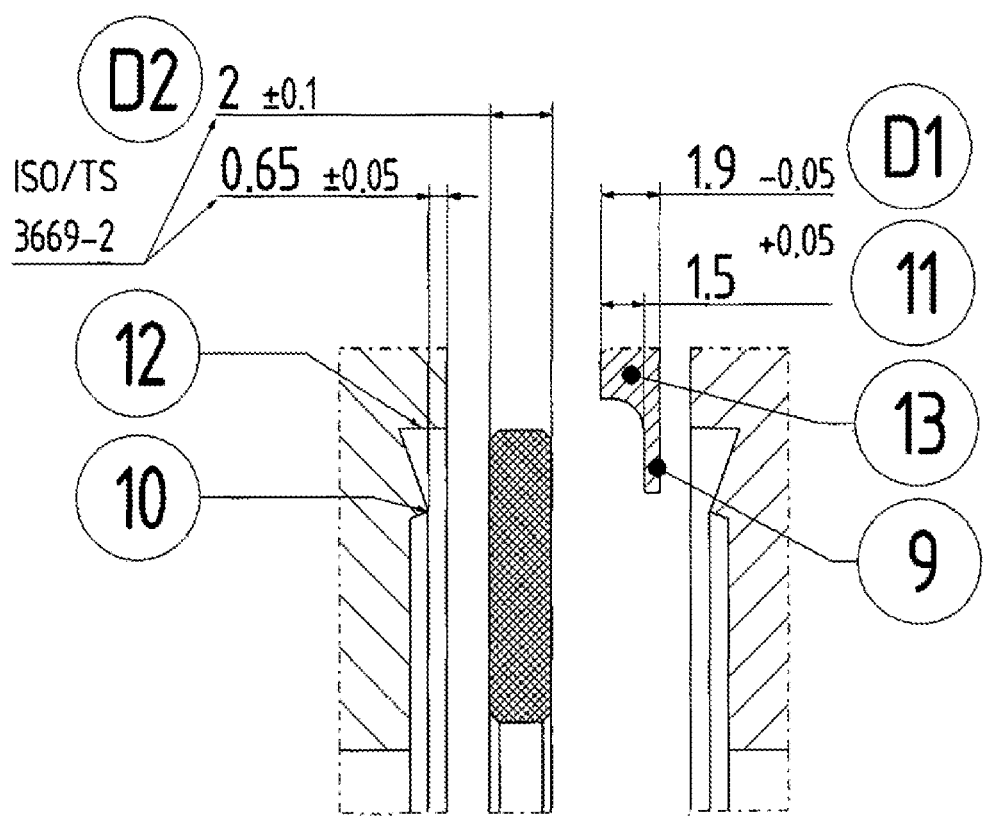

FIG. 3 shows a section through the mounting device. Since the gap D1—the thickness of the clamping jaw—of 1.9 mm between the two CF flanges 4, 8, which gap D1 arises from said clamping jaw of the mounting device, is less than the thickness D2 of the flat seal of 2 mm, the flat seal 3 remains in the correct position in the groove.

As an arrangement according to the invention, the nose 9 arranged at the end of the clamping jaw 13 forms a positive restricted guidance together with the recessed groove 12 of the flange, from which the flat seal 3 cannot be released during the further assembly of the flange connection. Since a total of three mounting devices 1, 2 in the form of screw clamps with a U-profile are positioned evenly distributed on the periphery of the flanges, it is impossible for the flat seal to release and fall out of the groove.

The enlarged detail in FIG. 3a from the box is reproduced twice and shows the positive connection. The upper part shows the mounting device with the clamping jaw 13 and the nose 9 as is used for forming the positive connection for the flat seal 3 in the groove 12. The lower part shows the same arrangement for more clearly illustrating and reproducing the information in a kind of exploded drawing.

Figure 4:
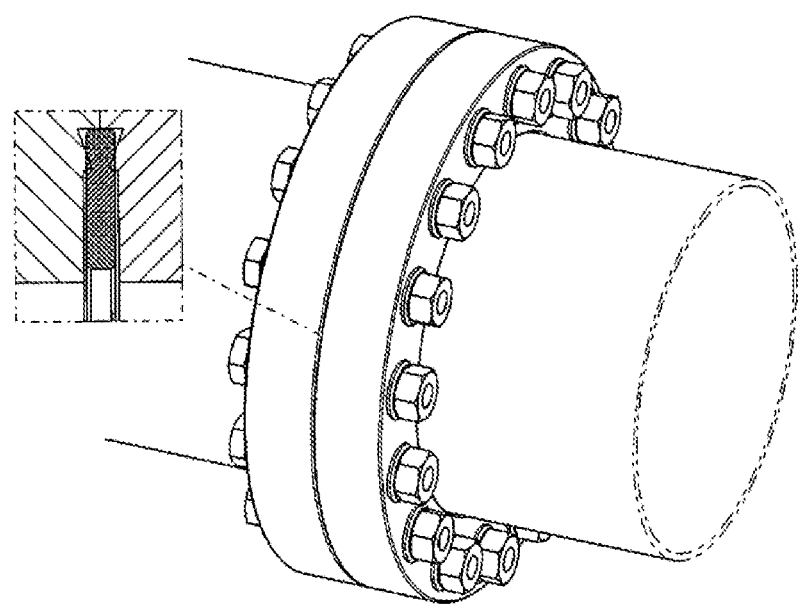
FIG. 4 shows a ready-assembled CF connection in an isometric view.

FIG. 4 shows the ready-assembled CF connection. After the knurled screws 2 of the mounting devices have been released, the mounting devices are pulled out. The nuts 7 are then tightened as specified, and the necessary contact pressure for the deformation of the flat seal is generated via the cutting edge 10.

FIGS. 5 to 8 show a mounting device for QCF flanges and a method for mounting the flat seal.

Figure 5:
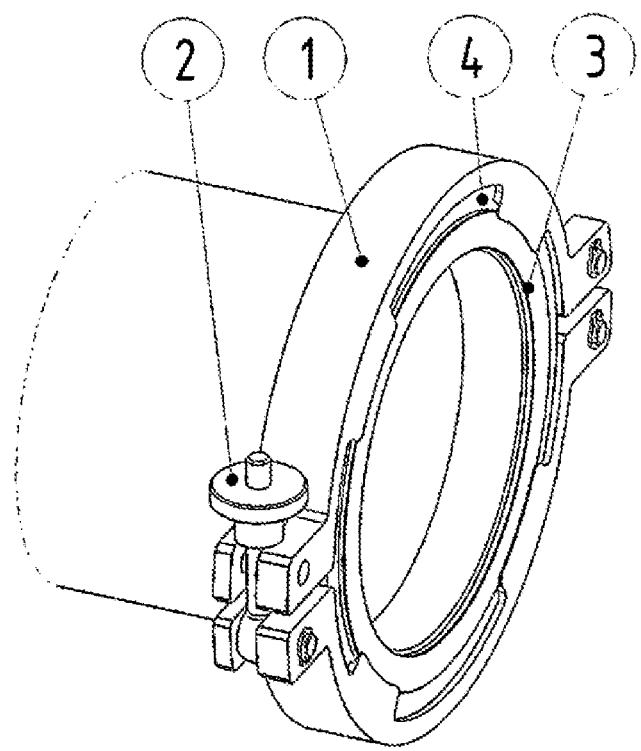
FIG. 5 shows a mounting device on a QCF flange in an isometric view.

FIG. 5 shows the mounting device on the QCF flange, in this case the clamping bracket according to the invention consisting of two parts on the periphery of the first flange 4.

The flat seal 3 for CF and QCF components normally consists of oxygen-free copper. It is positioned with the mounting device 1 on the QCF flange 4. Care should be taken that only the three retaining noses of the three clamping jaws rest against the flat seal; see FIG. 7. The knurled nut 2 is tightened.

Figure 6:
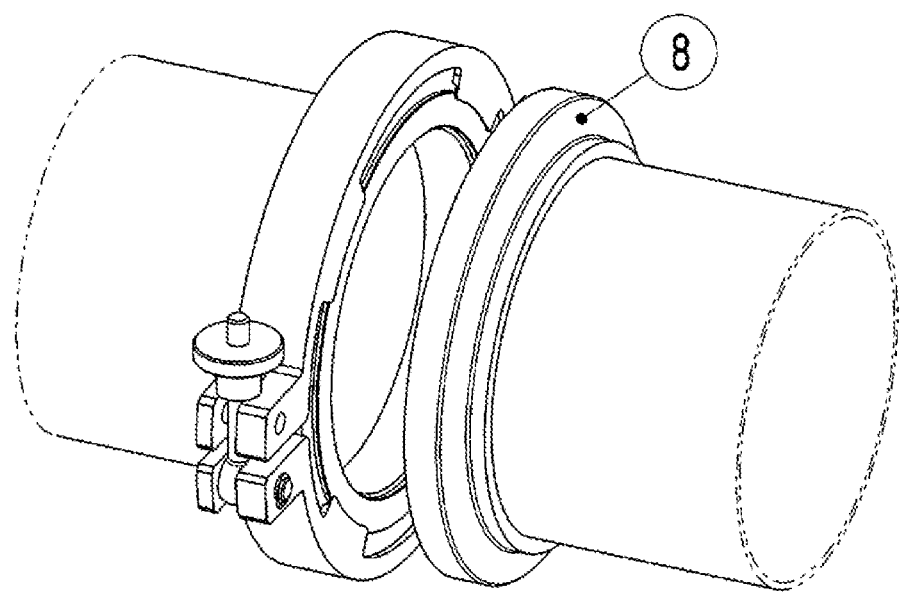
FIG. 6 shows QCF flanges aligned with each other in an isometric view.

FIG. 6 also shows the two preassembled QCF flanges. The counterflange 8 is axially aligned by hand and pushed onto the clamping bracket 1 as the mounting device according to the invention. The counterflange 8 is thereby brought into the exact position.

Figure 7A:
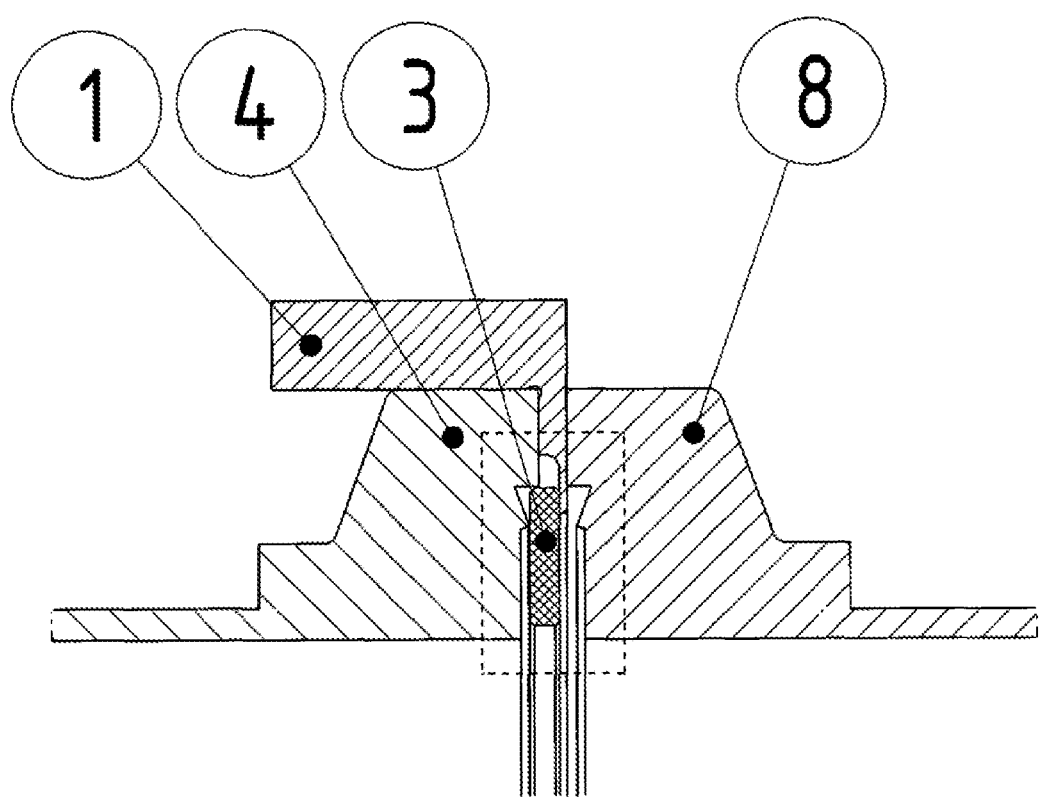
FIG. 7a) shows a section through the mounting device for QCF flanges.
Figure 7B:
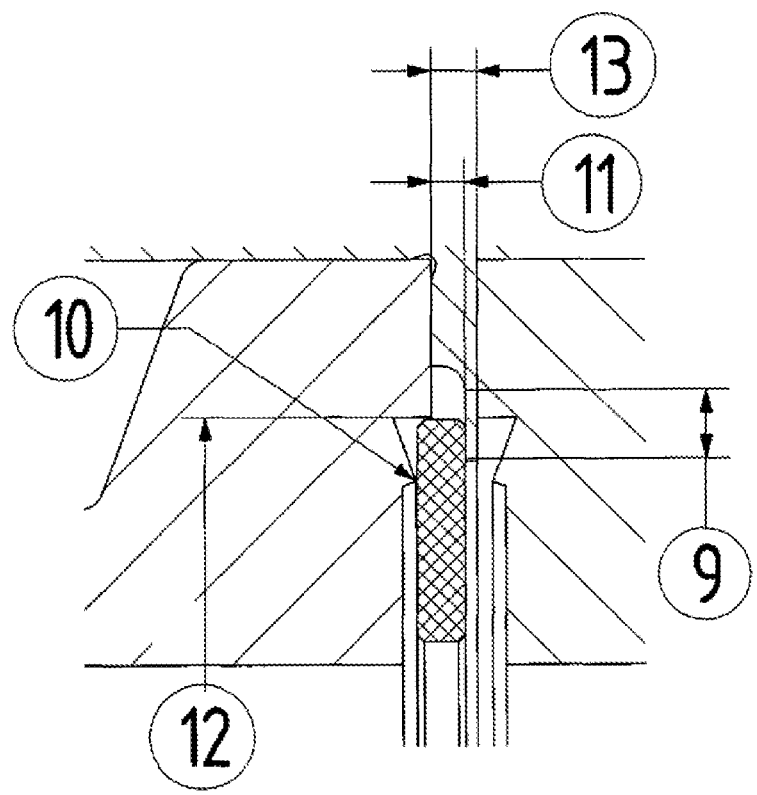
FIG. 7b) shows an enlarged detail according to the dotted box of a), with assembled components (top) and in an exploded view (bottom)
Figure 7B:
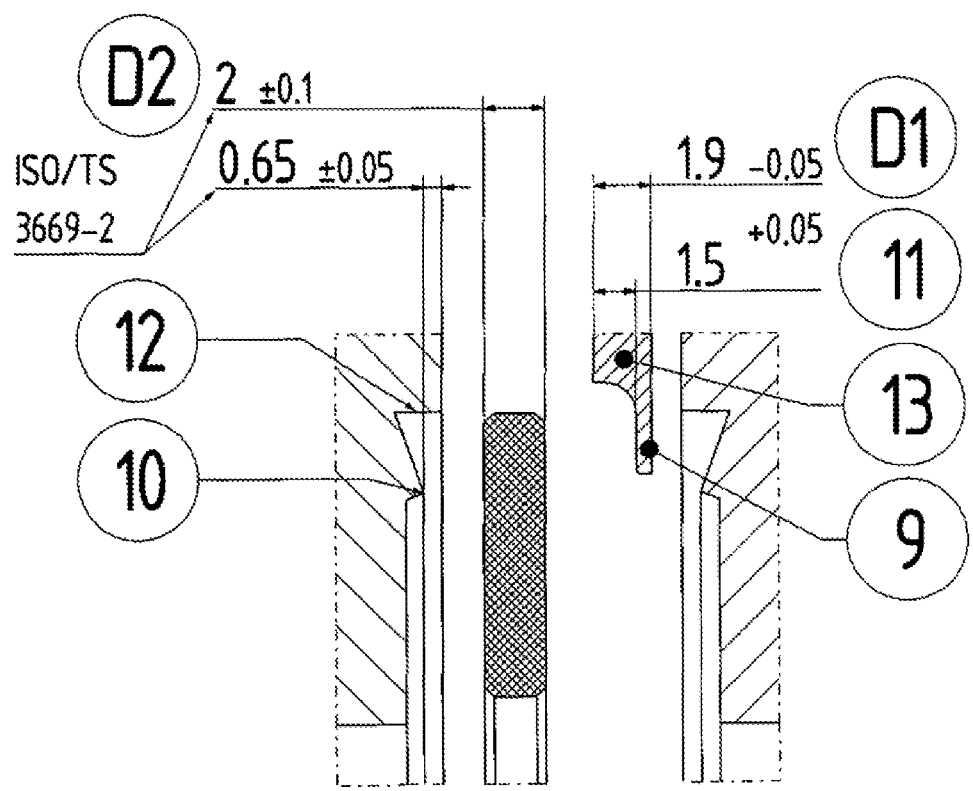

FIG. 7 shows a section of the mounting device. Since the gap created by the mounting device 1 is less than the thickness D2 of the flat seal of 2 mm due to the thickness D1 of the clamping jaw 13 of 1.9 mm between the QCF flanges 4, 8, the flat seal 3 cannot slip out of the groove and remains in the correct position. The four noses 9 of the four clamping jaws 13 each form, together with the groove 12 of the first QCF flange, a positive restricted guidance as an arrangement according to the invention from which the seal cannot slip out.

Also in this alternative arrangement, the noses 9 at the end of the clamping jaws together with the recessed groove 12 of the flange 4 form overall a positive restricted guidance as an arrangement according to the invention from which the flat seal 3 cannot be released during the further assembly of the flange connection. Since a clamping bracket with a total of four clamping jaws is used which in turn are positioned uniformly distributed at the circumference of the flange, it is impossible for the flat seal 3 to come out of the groove.

The enlarged detail of FIG. 7a according to the box is reproduced twice and shows the positive connection. The upper part thereby shows the mounting device with the clamping jaw 13 and the nose 9 as is used for forming the positive connection for the flat seal 3 in the groove 12. The lower part shows the same arrangement to more clearly illustrate and reproduce the dimensions in the manner of an exploded drawing.

Figure 8:
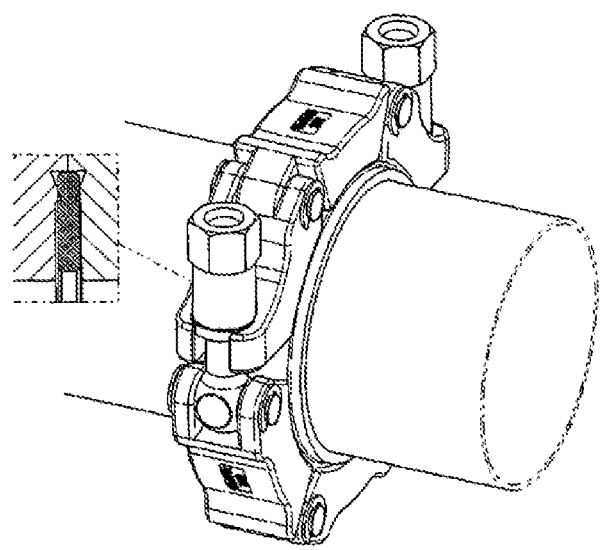
FIG. 8 shows a ready-assembled QCF connection in an isometric view.

FIG. 8 shows the ready-assembled QCF connection. After the knurled nut 2 has been released, the upper leg of the mounting device can be folded open. The QCF tension chain is then first placed in the upper part of the flange connection. As a result, the connection is already fixed by the weight and the shape of the tension chain, and the seal 3 is prevented from slipping or falling out. In the second step, the lower half of the clamping bracket as the mounting device between the two flanges can be withdrawn, and the tension chain can be finally assembled and the screws tightened. The QCF tension chain is then mounted as specified, and the contact pressure is generated (FIG. 8).

FIG. 4 and FIG. 7 respectively show the deformed flat seal corresponding to the contact pressure in the inlet.

The mounting device according to the invention is in particular relevant or can be used for mounting jet tubes, chambers, and other vacuum components of a vacuum system of accelerators (UHV), and in the mounting of vacuum test stands with flanges.

The mounting device can also be used in all areas of technology in which the use of flat seals during assembly of the flanges and exact positioning of the seal is difficult due to the structural particulars of the flanges.

Moreover, it is understood that the mounting devices according to the invention can be used for all commercially available (Q)CF flanges, and can be adapted to the size of the flanges and flat seals within the context of the expertise of a person skilled in the art in the field of UHV engineering. The mounting device according to the invention is therefore particularly adjustable to the different sizes of the flanges and flat seals, to the spacings of the screw holes in the flange, and to the different shapes of the flanges such as the (Q)CF flanges, presented here only as an example with or without tube attachment, through-flanges, welded flanges, (Q)CF intermediate pieces, (Q)CF reducers, elbows, (Q)CF-T pieces, (Q)CF cross pieces etc.

An arrangement according to the invention thus comprises a first flange 4 with groove 12 for the flat seal 3, and the mounting device according to the invention having at least one clamping jaw 13 arranged in the clearance between the flanges with a nose 9 tapering suddenly at the free end of the clamping jaw, wherein the nose and the groove together form a positive restricted guidance for the flat seal; see also FIGS. 3b and 7b, respectively.

In the embodiments illustrated in the Figures, the projection by which the flat seal 3 protrudes from the groove 12 is provided by:

$D2-T_{SK}$ equals the depth of step 11 according to the formula:

$$D2-T_{SK}=11, \text{ with } D2=\text{thickness of the flat seal 3 and}$$
$$T_{SK}=\text{depth of the cutting edge 10, wherein}$$
$$D1<D2.$$

Taking into account all tolerances ($D2=2\pm0.1$ mm, $T_{SK}=0.65\pm0.05$ mm, and depth of the step=1.5+0.05 mm), a clearance of 0 to 0.2 mm results between the seal and the nose. This also determines the extent of the thickness of the nose at the free end of the clamping jaw.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A mounting device for a flange connection having a first flange, a second flange, and a flat seal arranged between the first and second flanges, the mounting device comprising:
a clamp comprising a clamping jaw for a clearance between the first flange and the second flange, the clamping jaw tapering at a free end thereof to a nose for holding the flat seal,
wherein the tapering comprises a rounded contour, and
wherein the free end of the clamping jaw comprises a thinnest portion of the clamping jaw.

2. The mounting device according to claim 1, wherein the clamp comprises a screw clamp with a U-shaped profile.

3. The mounting device according to claim 1, wherein the clamp comprises a clamping bracket with an L-shaped profile.

4. The mounting device according to claim 3, wherein the clamping bracket comprises a two-leg clamping bracket with a joint.

5. The mounting device according to claim 1, further comprising a fastener comprising a knurled nut or a knurled screw or a quick-release fastener,
wherein the fastener is configured to fasten the mounting device to an outside of the first flange.

6. A kit for connecting (Q)CF flanges, comprising:
hexagonal bolts;
hexagonal nuts;
washers; and
at least one mounting device according to claim 1.

7. A method for mounting a flat seal in a flange connection comprising two flanges, the method comprising:
a) inserting the flat seal into a groove of a first of the two flanges, wherein an outer edge of the flat seal adjoins an outer edge of the groove;
b) selecting a mounting device having a clamping jaw and a tapering nose at an end of the clamping jaw, wherein a thickness of the clamping jaw of the mounting device is selected to be smaller than a thickness of the flat seal;
c) pressing the clamping jaw of the mounting device against an inside of the first flange, wherein the nose of the clamping jaw is positioned over the outer edge of the flat seal and opposite the groove of the first flange;
d) fastening, by a fastener thereof, the mounting device to the first flange arranged outside of a clearance for the flange connection, whereby the flat seal is fixed in the groove of the first flange;
e) pressing a second of the two flanges against the first flange, wherein the second flange is distanced from the flat seal by the clamping jaw;
f) releasing the fastener of the mounting device and removing the clamping jaw from the clearance between the two flanges, wherein the flat seal remains held in its position in the groove of the first flange; and
g) generating a contact pressure and deforming the flat seal in the flange connection.

8. The method according to claim 7, further comprising, between step d) and step e), checking a correct seating of the flat seal in the groove of the first flange by existence of a free rotation capability of the flat seal in the groove.

9. The method according to claim 7, wherein the contact pressure is generated by screws for fastening the two flanges to one another,
wherein the screws are guided through the two flanges after step e) and before step f),
wherein the flanges are secured loosely to each other with nuts so that a screw clamp as a mounting device comprising the two flanges loosely fastened to each other is released from the first flange, and the holding jaw is removed from the gap between the two flanges, and
wherein the flat seal remains positioned in the groove of the first flange and the second flange.

10. The method according to claim 7, wherein the contact pressure is generated by a tension chain for fastening the two flanges to one another,
wherein the tension chain is placed over the two flanges after step f), after detaching and removing a clamping bracket as a mounting device, and
wherein the flat seal remains positioned in the groove of the first flange and the second flange.

11. The method according to claim 7, wherein neither of two cutting edges of the two flanges touches the nose of the clamping jaw of the mounting device, so that the cutting edges are protected from damage.

12. An arrangement, comprising:
a first flange with a groove for a flat seal; and
a mounting device with a clamping jaw having a nose arranged in a clearance of the flange, wherein the clamping jaw tapers at a free end thereof to the nose for holding the flat seal,
wherein the nose and the groove together form a restricted guidance for the flat seal,
wherein the tapering comprises a rounded contour, and
wherein the free end of the clamping jaw comprises a thinnest portion of the clamping jaw.

13. The method according to claim 7, wherein the first flange further comprises a cutting edge in the groove.

14. The arrangement according to claim 12, wherein the first flange further comprises a cutting edge in the groove.

* * * * *